United States Patent [19]

Ogasawara et al.

[11] Patent Number: 4,737,922
[45] Date of Patent: Apr. 12, 1988

[54] TEXT PROCESSING APPARATUS

[75] Inventors: Satoshi Ogasawara; Masato Soshi, both of Tokyo, Japan

[73] Assignee: Casio Computer Co., Ltd., Tokyo, Japan

[21] Appl. No.: 774,975

[22] Filed: Sep. 11, 1985

[30] Foreign Application Priority Data

Sep. 18, 1984 [JP] Japan ............................... 59-195190

[51] Int. Cl.⁴ ..................... G06F 3/09; G06F 15/02; B41J 5/30
[52] U.S. Cl. .................................. 364/519; 364/523; 364/900; 400/3; 400/70; 400/279
[58] Field of Search ........ 364/518, 519, 900 MS File; 340/723, 735; 400/22, 61-64, 279, 3, 4, 5, 12, 17, 70

[56] References Cited

U.S. PATENT DOCUMENTS

| | | | |
|---|---|---|---|
| 4,056,821 | 11/1977 | Vittorelli | 364/900 |
| 4,323,315 | 4/1982 | Demonte et al. | 400/63 |
| 4,429,372 | 1/1984 | Berry et al. | 364/900 |
| 4,435,778 | 3/1984 | Cason et al. | 364/900 |
| 4,491,933 | 1/1985 | Ursin et al. | 364/900 |
| 4,495,490 | 1/1985 | Hopper et al. | 340/723 |
| 4,504,828 | 3/1985 | Couper et al. | 340/735 |
| 4,507,753 | 3/1985 | McCaskill et al. | 364/900 |
| 4,648,047 | 3/1987 | Berkland et al. | 364/519 |

FOREIGN PATENT DOCUMENTS 76902   4/1983   European Pat. Off. ............ 364/900

OTHER PUBLICATIONS

Franklin: Printing Underscore Characters and Storing Representations Thereof, IBM Tech. Discl. Bull, vol. 21, No. 6, 11/1978.
Moore: Uniform Word Underscoring in Proportionally Spaced Printer, IBM Tech. Discl. Bull., vol. 22, No. 6, Nov. 79, pp. 2178-2182.
Gutzmann: Das Schnelldrucker-Setz Programm Scriptor, Applied Informatives, 6/1979, pp. 256-258.

Primary Examiner—Felix D. Gruber
Attorney, Agent, or Firm—Frishauf, Holtz, Goodman & Woodward

[57] ABSTRACT

Data output apparatus registers special format data added to specific character data together therewith in a registered word memory. When sentence data is read out from a sentence memory, the character data included in the sentence data and coinciding with the specific character data is automatically printed with the special format data.

4 Claims, 3 Drawing Sheets

FIG. 2

|   | 0 | 1 | 2 | 3 | 4 | 5 | |   |
|---|---|---|---|---|---|---|---|---|
| A(0) | F | O | R | S T |   |   | UNDER-LINE CODE | B(0) |
| A(1) |   |   |   |   |   |   |   | B(1) |
| A(2) |   |   |   |   |   |   |   | B(2) |
| A(3) |   |   |   |   |   |   |   | B(3) |
| A(4) |   |   |   |   |   |   |   | B(4) |

"for"

10 <u>for</u> i = 1 to 1000

20     <u>for</u> j = 1 to 32

30     print i x j ;

40     next j 50 next i

60 <u>format</u> ; files 70 open "o;test" <u>for</u> output as #1

80 end

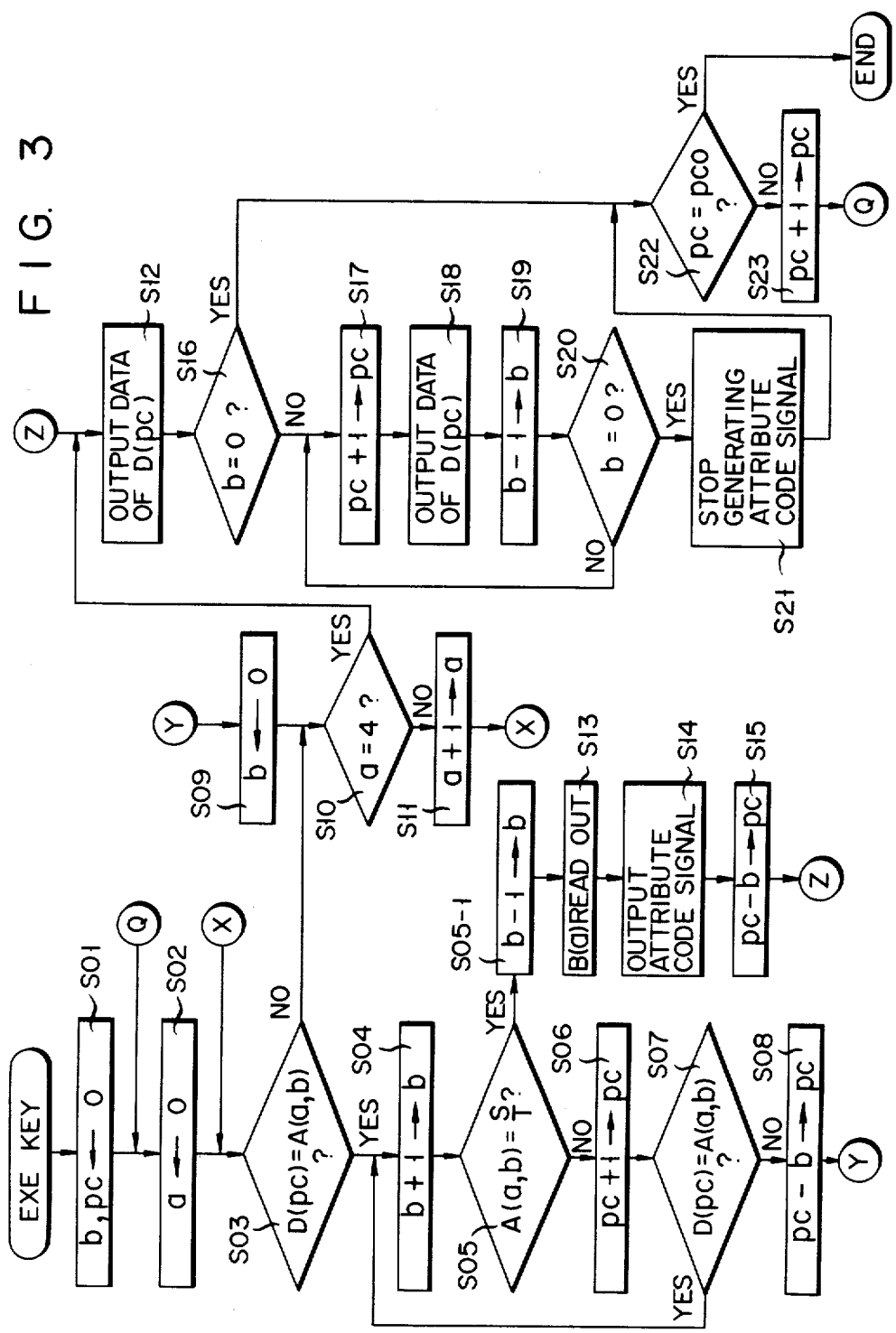

TEXT PROCESSING APPARATUS

BACKGROUND OF THE INVENTION

The present invention relates to a data output apparatus for registering special format data with respect to specific character data, and automatically out-putting character data in a special format, with the special format data added to the specific character data.

Conventionally, in a data output apparatus such as a wordprocessor, when a specific word is to be printed with, e.g., an underline, an underline mode is first designated, and thereafter, the specific word is inputted. Then, the specific word with the underline is printed, and the underline mode is cancelled.

However, when a number of identical words to be underlined are present in a single paragraph or page, every time the word is inputted, the underline mode must be repeatedly designated and cancelled. Thus, it requires frequent operations and extra time, resulting in inconvenience.

SUMMARY OF THE INVENTION

The present invention has been made in consideration of the above situation, and has as its object to provide a data output apparatus which can execute registration, comparison, display, printing and the like of a desired word in a special format with special format data such as underline, enlargement, reverse display and the like.

According to the present invention, in order to achieve the above object, there is provided a data output apparatus comprising:

input means including keys for inputted desired character data and special format data with respect to the character data;

memory means for storing the character data and the special format data inputted by the input means;

discriminating means for discriminating, when sentence data is inputted by the input means, whether or not the sentence data includes the desired character data stored in the memory means; and output means for outputting, when character data coinciding with the desired character data stored in the memory means is included in the sentence data, the coincided character data in accordance wih the special format data.

With the above arrangement, the data output apparatus of the present invention can register special format data with respect to specific character data together with the specific character data in a registered word memory. When sentence data is read out, the specific character data can be automatically outputted in the special format. Therefore, the number of key operations can be greatly decreased, and high efficiency word processing can be achieved.

BRIEF DESCRIPTION OF THE DRAWINGS

FIG. 2 is a memory map of a registered word memory shown in FIG. 1;

FIG. 3 is a flow chart for explaining an operation of the apparatus shown in FIG. 1; and FIG. 4 is a view showing a printing example of the data output apparatus of the present invention.

DETAILED DESCRIPTION OF THE PREFERRED EMBODIMENT

Figure 1:
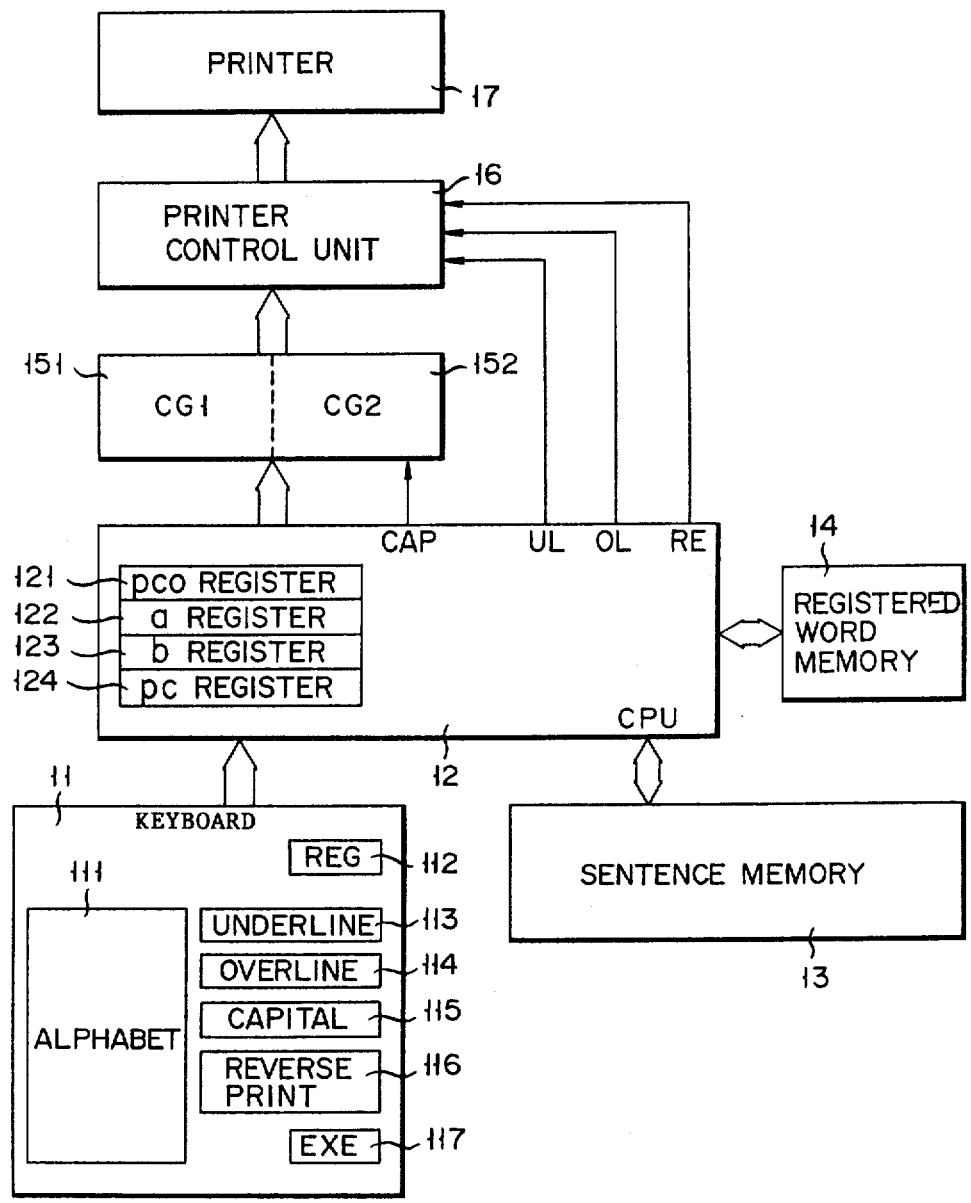
FIG. 1 is a block diagram showing a data output apparatus according to an embodiment of the present invention.

An embodiment of the present invention will be described with reference to the accompanying drawings. FIG. 1 shows a circuit configuration of a data output apparatus of the present invention. Reference numeral 11 denotes a keyboard. The keyboard 11 comprises alphabet letter keys 111, a registration key 112 for registering a desired character string, an underline key 113 for designating an underlined mode, an overline key 114 for designating an overline mode, a capital key 115 for designating a capital mode, a reverse print key 116 for designating reverse printing, and an execution key (indicated by "EXE" in FIG. 1) 117 for executing printing. When these keys are operated, input data is supplied to a CPU 12. The CPU 12 executes a control operation in accordance with the input data, and comprises a register group consisting of a PCO register 121 for storing a final address of sentence data, an a register 122 for storing a row address of registered word data, a b register 123 for storing a digit address, and a PC register 124 for storing a corresponding address of character data to be compared. The CPU 12 performs data communication between a sentence memory 13 for storing sentence data and a registered word memory 14 for storing registered word data, and supplies character code data to a first character generator (indicated by "CG1" in FIG. 1) 151 and a second character generator (indicated by "CG2" in FIG. 1) 152. The CPU 12 supplies capital code data (indicated by "CAP" in FIG. 1) as attribute code data particularly to the generator 152. The generators 151 and 152 supply to a printer control unit 16 character pattern data corresponding to character code data of small letter and capital code data supplied thereto. The unit 16 receives from the CPU 12 underline code data (indicated by "UL" in FIG. 1), overline code data (indicated by "OL" in FIG. 1) and reverse printing code data (indicated by "RE" in FIG. 1) as attribute code data, and causes a printer 17 to print in accordance with the attribute code data an the character pattern data.

FIG. 2 schematically shows a storage area of the memory 14. The storage area consists of a plurality of rows, i.e., five rows, and can store a registered word in each row, i.e., totally five words. Each row is constituted by an A portion for storing character code data of a registered word and a B portion for storing attribute code data thereof. The A portion can store the character code data of, e.g., 6 digits. FIG. 2 shows that a word "FOR" is stored in the first row as a row address "0", and character code data "F", "O" and "R" are stored in first three digit addresses "0" to "2" of the A portion. In addition, a stop code (indicated by "ST" in FIG. 2) indicating that character code input operation of the registered word ends is stored in a fourth digit address "3", and underline code data is stored in the B portion.

The operation of the above embodiment will be described with reference to the flow chart shown in FIG. 3. In advance, sentence data is stored in the memory 13, and word data designating its attribute data is stored in the memory 14. Thereafter, when the EXE key 117 is operated, storage contents of the b register 123 storing a digit address and the PC register 124 for storing an address of character data to be compared are cleared to "0" in step S01. In step S02, a storage content of the a register 122 is also cleared to "0". In step S03 it is checked if character data at an address in the sentence memory 13 designated by the b register 124 (indicated by "D(PC)" in FIG. 3) and character data at a row address and a digit address in the A portion of the word memory 14 respectively designated by the registers 122 and 123 (indicated by "A(a,b)" in FIG. 3) are equal to each other. In this case, it is checked whether or not first character data at the address "0" in the sentence memory 13 and character data at row and digit addresses "0,0" in the A portion of the word memory 14 are equal to each other. If YES in step S03, the flow advances to step S04. In step S04, the content of the b register 123 is incremented by one, thereby updating a digit designation address of the word memory 14. It is checked in step S05 if the character code at the updated address of the memory 14, i.e., at A(a,b) is the stop code. If NO in step S05, the content of the register 124 is incremented by one in step S06, and the flow advances to step S07. It is checked in step S07 if the character data in the memories 13 and 14 coincide with each other in the same manner as in step S03. If YES in step S07, the flow returns to step S04 so as to check coincidence of the next character data. However, if NO in step S07, a value obtained by subtracting the content of the register 123 from that of the register 124, i.e., a value after processing in step S03 is finally performed is set in the register 124. In step S09, the content of the register 123 is cleared so as to make comparison of characters at new rows, and thereafter, the flow advances to step S10. Step S10 is also performed when it is determined in step S03 that the character data in the memories 13 and 14 do not coincide with each other, and it checked if the content of the register 122 is "4" indicating the fourth row as the final row. If NO in step S10, this means that the row address of the memory 14 designated by the register 122 can still be updated. Therefore, in step S11, the content of the register 122 is incremented by one, and thereafter, the operation from step S03 is repeated. However, if YES in step S10, this means that the row address of the memory 14 is the address of the final row and can no longer be updated. Therefore, the character data in the final row is printed as shown in step S12.

If YES in step S05, i.e., if it is determined that the character data located at the row and digit addresses designated by the registers 122 and 123 of the memory 14 is the stop code, the flow advances to step S05-1 and the digit of the stop code is decremented by one and is newly set as the b digit. Then, the flow advances to step S13, and the CPU 12 reads out the attribute code data of the registered word located at the row address designated by the register 122. Then, in step S14, the CPU 12 supplies the readout data to the printer control unit 16 or the character generator 152. Thereafter, in step S15, the content of the b register 123 is subtracted from that of the PC register 124 so as to designate start character data of the registered words. Then, the flow advances to step S12.

In step S12, the character code data located at the address in the memory 13 designated by the PC register 124 is supplied to the character generators 151 and 152. In response to this, the generators 151 and 152 supply the character pattern data to the control unit 16 so as to cause the printer 17 to print it. In this case, when the attribute code data is supplied to the unit 16 or the generator 152 in step S14, printing corresponding to the attribute code data is performed. It is checked in step S16 if the content of the b register 123 is "0". If NO in step S16, since printing of the character data of the registered word of the memory 13 is not completed, the content of the PC register 124 is incremented by one in step S17. In step S18, the character data in the sentence memory 13 located at the updated position designated by the PC register 124 is printed. In this case, since the attribute code data is continuously supplied to the printer control unit 16 or the character generator 152, the printing is performed in accordance with the attribute code data. In step S19, since printing for one character ends, the content of the b register 123 is decremented by one. Thereafter, it is checked in step S20 if the updated content of the b register 123 is "0". If NO in step S20, the operation from step S17 is repeated. If YES in step S20, since printing of the registered character string is completed, the flow advances to step S21 so as to stop generating the attribute code data from the CPU 12. Then, it is checked in step S22 if the content of the PC register 124 is equal to that of the PC0 register 121 for storing the final address of the sentence data, e.g., "30". Step S22 is also executed when it is determined in step S16 that the content of the b register 123 is "0". If NO in step S22, the flow advances to step S23 and the content of the PC register 124 is incremented by one. Thereafter, the operation from step S02 is repeated.

FIG. 4 shows a printing example of this embodiment. As shown in FIG. 2, a word "FOR" and an underline code as an attribute code thereof are registered in the word memory 14, and thereafter, the printing operation shown in FIG. 3, is executed with respect to program statements stored in the sentence memory 13. Referring to FIG. 4, the word "FOR" is included in the program statements of statement numbers 10, 20, 60 and 70, and these "FOR"s are printed with the underline.

Note that in the above embodiment, for example, when the word "FOR" is registered so as to be printed with the underline, the underline is added to a "FOR" portion of a word "FORMAT" in the statement number 60. However, this difficulty can be overcome in such a manner that when the "FOR" is searched, it is checked if character data is present at the next position, and if present, control is such that the attribute code data is not generated.

In equipment such as an electronic typewriter which performs printing upon depression of a character key, when a word is registered, the printing operation is awaited until a last letter of the word is inputted, and when it is determined that the registered word is completely inputted, the word can be printed with desired attribute data.

What is claimed is:

1. A character data output apparatus, comprising:
input means for inputting sentence data, and for inputting certain groups of character data with associated special format data which format data enables the corresponding group of character data to be printed in a desired format;
first memory means for storing the certain groups of character data and the associated special format data inputted by said input means;
second memory means for storing the sentence data inputted by said input means excluding the special format data;
processing means for discriminating if the sentence data stored in said second memory means includes character data groups coinciding with the certain groups of character data stored in said first memory means; and
output means for automatically outputting, when said processing means discriminates that a character data group coinciding with the certain groups of character data stored in said first memory means is included in the sentence data, all the coinciding character data groups in the sentence data stored in said second memory means in accordance with the associated special format data as stored in said first memory means.

2. An apparatus according to claim 1, wherein said input means includes at least an underline key.

3. An apparatus according to claim 1, wherein said first memory means comprises a plurality of storage areas, and each area stores character data for one registered word and attribute code data corresponding to the special format data associated with the registered word.

4. An apparatus according to claim 1, wherein said input means comrises a predetermined key which is operative to initiate the discrimination operation by said processing means.

* * * * *